(12) United States Patent
Liba et al.

(10) Patent No.: US 12,266,113 B2
(45) Date of Patent: Apr. 1, 2025

(54) AUTOMATICALLY SEGMENTING AND ADJUSTING IMAGES

(71) Applicant: Google LLC, Mountain View, CA (US)

(72) Inventors: Orly Liba, Palo Alto, CA (US);
Florian Kainz, San Rafael, CA (US);
Longqi Cai, Mountain View, CA (US);
Yael Pritch Knaan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 470 days.

(21) Appl. No.: 17/617,560

(22) PCT Filed: Jul. 15, 2019

(86) PCT No.: PCT/US2019/041863
§ 371 (c)(1),
(2) Date: Dec. 8, 2021

(87) PCT Pub. No.: WO2021/010974
PCT Pub. Date: Jan. 21, 2021

(65) Prior Publication Data
US 2022/0230323 A1    Jul. 21, 2022

(51) Int. Cl.
*G06T 7/11* (2017.01)
*G06T 5/60* (2024.01)
(Continued)

(52) U.S. Cl.
CPC .......... *G06T 7/11* (2017.01); *G06T 5/60* (2024.01); *G06T 5/70* (2024.01); *G06T 5/94* (2024.01); *G06V 10/764* (2022.01)

(58) Field of Classification Search
None
See application file for complete search history.

(56) References Cited

U.S. PATENT DOCUMENTS

| | | |
|---|---|---|
| 6,804,409 B2 | 10/2004 | Sobol et al. |
| 7,099,056 B1 | 8/2006 | Kindt |
| (Continued) | | |

FOREIGN PATENT DOCUMENTS

| | | | |
|---|---|---|---|
| KR | 20040077240 | 9/2004 | |
| WO | WO-2017071644 A1 * | 5/2017 | ............... H04N 9/73 |
| WO | 2021010974 | 1/2021 | |

OTHER PUBLICATIONS

Z. Yan, H. Zhang, B. Wang, S. Paris, and Y. Yu, "Automatic photo adjustment using Deep Neural Networks," ACM Transactions on Graphics, vol. 35, No. 2, pp. 1-15, Feb. 2016. doi: 10.1145/2790296 (Year: 2016).*

(Continued)

*Primary Examiner* — Utpal D Shah
*Assistant Examiner* — Charles C L Penny
(74) *Attorney, Agent, or Firm* — McDonnell Boehnen Hulbert & Berghoff LLP

(57) ABSTRACT

A device automatically segments an image into different regions and automatically adjusts perceived exposure-levels or other characteristics associated with each of the different regions, to produce pictures that exceed expectations for the type of optics and camera equipment being used and in some cases, the pictures even resemble other high-quality photography created using professional equipment and photo editing software. A machine-learned model is trained to automatically segment an image into distinct regions. The model outputs one or more masks that define the distinct regions. The mask(s) are refined using a guided filter or other technique to ensure that edges of the mask(s) conform to edges of objects depicted in the image. By applying the mask(s) to the image, the device can individually adjust respective characteristics of each of the different regions to produce a higher-quality picture of a scene.

18 Claims, 8 Drawing Sheets

(51) Int. Cl.
  *G06T 5/70* (2024.01)
  *G06T 5/94* (2024.01)
  *G06V 10/764* (2022.01)

(56) References Cited

U.S. PATENT DOCUMENTS

| | | | |
|---|---|---|---|
| 8,483,479 | B2 | 7/2013 | Kunkel et al. |
| 8,890,975 | B2 | 11/2014 | Baba et al. |
| 9,002,068 | B2 | 4/2015 | Wang |
| 10,521,952 | B2 | 12/2019 | Ackerson et al. |
| 10,742,899 | B1* | 8/2020 | Ma .................... G06T 7/11 |
| 2009/0207266 | A1 | 8/2009 | Yoda |
| 2010/0149420 | A1* | 6/2010 | Zhang ............... H04N 9/73 348/E9.051 |
| 2010/0322513 | A1* | 12/2010 | Xu ..................... G06T 5/20 382/167 |
| 2011/0090303 | A1 | 4/2011 | Wu et al. |
| 2011/0117959 | A1* | 5/2011 | Rolston ............. H04N 9/3176 455/556.1 |
| 2012/0002074 | A1 | 1/2012 | Baba et al. |
| 2012/0051635 | A1 | 3/2012 | Kunkel et al. |
| 2013/0314558 | A1 | 11/2013 | Ju et al. |
| 2014/0118578 | A1* | 5/2014 | Sasaki ................ G06T 5/20 348/241 |
| 2014/0126780 | A1 | 5/2014 | Wang |
| 2019/0130630 | A1 | 5/2019 | Ackerson et al. |
| 2019/0171908 | A1 | 6/2019 | Salavon |
| 2021/0329150 | A1 | 10/2021 | Wang et al. |

OTHER PUBLICATIONS

K. He, J. Sun and X. Tang, "Guided Image Filtering," in IEEE Transactions on Pattern Analysis and Machine Intelligence, vol. 35, No. 6, pp. 1397-1409, Jun. 2013, doi: 10.1109/TPAMI.2012.213 (Year: 2013).*

Kaufman, D. Lischinski, and M. Werman, "Content-Aware automatic photo enhancement," Computer Graphics Forum, vol. 31, No. 8, pp. 2528-2540, Sep. 2012. doi: 10.1111/j.1467-8659.2012.03225.x (Year: 2012).*

B. Jiang et al., "Single image fog and haze removal based on self-adaptive guided image filter and color channel information of Sky Region," Multimedia Tools and Applications, vol. 77, No. 11, pp. 13513-13530, Jul. 2017. doi: 10.1007/s11042-017-4973-6 (Year: 2017).*

S. Nam, and S.J. Kim, "Deep Semantics-Aware Photo Adjustment", ArXiv Computer Vision and Pattern Recognition, Jun. 2017. doi: 1706.08260 (Year: 2017).*

G. Hu and J. Clark, "Instance Segmentation Based Semantic Matting for Compositing Applications," 2019 16th Conference on Computer and Robot Vision (CRV), Kingston, QC, Canada, 2019, pp. 135-142, doi: 10.1109/CRV.2019.00026 (Year: 2019).*

Xu, N., Price, B., Cohen, S., & Huang, T. (2017). Deep image matting. In Proceedings of the IEEE conference on computer vision and pattern recognition (pp. 2970-2979). (Year: 2017).*

"Improving Autofocus Speed in Macrophotography Applications", Technical Disclosure Commons—https://www.tdcommons.org/dpubs_series/5133, May 11, 2022, 9 pages.

"Reinforcement Learning—Wikipedia", Retrieved from: https://en.wikipedia.org/wiki/Reinforcement_learning—on May 11, 2022, 16 pages.

Gordon, "How to Use HDR Mode When Taking Photos", Dec. 17, 2020, 13 pages.

Hasinoff, et al., "Burst photography for high dynamic range and low-light imaging on mobile cameras", Nov. 2016, 12 pages.

Hollister, "How to guarantee the iPhone 13 Pro's macro mode is on", Retrieved at: https://www.theverge.com/22745578/iphone-13-pro-macro-mode-how-to, Oct. 26, 2021, 11 pages.

Kains, et al., "Astrophotography with Night Sight on Pixel Phones", https://ai.googleblog.com/2019/11/astrophotography-with-night-sight-on.html, Nov. 26, 2019, 8 pages.

Konstantinova, et al., "Fingertip Proximity Sensor with Realtime Visual-based Calibration", Oct. 2016, 6 pages.

"International Preliminary Report on Patentability", Application No. PCT/US2019/041863, Jan. 18, 2022, 10 pages.

"International Search Report and Written Opinion", PCT Application No. PCT/US2019/041863, Mar. 16, 2020, 17 pages.

Chatterjee, et al., "Clustering-Based Denoising with Locally Learned Dictionaries", IEEE Transactions on Image Processing, vol. 18, No. 7, Jul. 2009, 14 pages.

Fried, et al., "Perspective-Aware Manipulation of Portrait Photos", SIGGRAPH '16 Technical Paper, Jul. 24-28, 2016, Anaheim, CA, 10 pages.

Gao, et al., "Scene Metering and Exposure Control for Enhancing High Dynamic Range Imaging", Technical Disclosure Commons; Retrieved from https://www.tdcommons.org/dpubs_series/3092, Apr. 1, 2020, 12 pages.

Gupta, "Techniques for Automatically Determining a Time-Lapse Frame Rate", Technical Disclosure Commons, Retrieved from https://www.tdcommons.org/dpubs_series/3237, May 15, 2020, 11 pages.

Huth, et al., "Significantly Improved Precision of Cell Migration Analysis in Time-Lapse Video Microscopy Through Use of a Fully Automated Tracking System", Apr. 2010, 12 pages.

Kaufman, et al., "Content-Aware Automatic Photo Enhancement", Computer Graphics Forum, vol. 31, No. 8, pp. 2528-2540, 2012, 13 pages.

La Place, et al., "Segmenting Sky Pixels in Images", 2017, 11 pages.

Mohtasham, et al., "Real-time Image Signal Processor Stats Management to Save Power and CPU Cycles", Technical Disclosure Commons; Retrieved from https://www.tdcommons.org/dpubs_series/3308, Jun. 10, 2020, 7 pages.

Moraldo, "Virtual Camera Image Processing", Technical Disclosure Commons; Retrieved from https://www.tdcommons.org/dpubs_series/3072, Mar. 30, 2020, 10 pages.

Yang, et al., "Improved Object Detection in an Image by Correcting Regions with Distortion", Technical Disclosure Commons; Retrieved from https://www.tdcommons.org/dpubs_series/3090, Apr. 1, 2020, 8 pages.

Yang, et al., "Using Image-Processing Settings to Determine an Optimal Operating Point for Object Detection on Imaging Devices", Technical Disclosure Commons; Retrieved from https://www.tdcommons.org/dpubs_series/2985, Mar. 4, 2020, 10 pages.

Zhu, et al., "What's the Role of Image Matting in Image Segmentation?", Proceeding of the IEEE International Conference on Robotics and Biomimetrics, Shenzhen, China, Dec. 2013, 4 pages.

* cited by examiner

AUTOMATICALLY SEGMENTING AND ADJUSTING IMAGES

RELATED APPLICATION(S)

This application is a national stage entry of International Application No. PCT/US2019/041863, filed Jul. 5, 2019, the disclosure of which is incorporated herein by reference in its entirety.

Background

Mobile computing devices commonly include a camera for capturing images and videos. Some mobile computing devices (e.g., mobile phones) include advanced camera technology for producing high-quality images similar to those taken using professional camera equipment. Some users who may have relied on a dedicated camera device in the past, may now take pictures almost exclusively using a camera that is built-in to a mobile phone. Despite having advanced camera technology, some mobile computing devices struggle to produce high-quality pictures that satisfy user expectations. Such expectations may be unrealistic, particularly considering a camera in a mobile phone might not be suitable for certain conditions, for example, low-light images or images with multiple light sources may be more difficult to process.

SUMMARY

A computing device is described that automatically segments an image into different regions and automatically adjusts perceived exposure-levels, noise, white balance, or other characteristics associated with each of the different regions. The computing device executes a machine-learned model that is trained to automatically segment an "original" image (e.g., a raw image, a low-resolution variant, or an enhanced version) into distinct regions. The model outputs a mask that defines the distinct regions and the computing device then refines the mask using edge-aware smoothing techniques, such as a guided filter, to conform the edges of the mask to the edges of objects depicted in the image. By applying the refined mask to the image, the computing device can individually adjust the characteristics of each of the different regions to produce a "new" image that appears to have higher quality by matching the human perception of different parts of a scene.

The computing device can perform the described techniques automatically, with or without user input. By using the machine-learned model the computing device can coarsely define boundaries of different regions and then, using refinement and/or a statistical method, the computing device can adjust the mask for each region to be sized and matched to the edges of objects depicted in the image. The computing device can therefore accurately identify the different regions and accurately define the edges of the different regions. In this way, a more accurate and complete segmentation of the original image can be provided. By automatically segmenting an image before adjusting the image, the computing device can adjust each of the different regions separately rather than adjusting the entire image universally by applying adjustments to all the different regions, even though some adjustments may be inappropriate for some parts of the image. The computing device may therefore produce a higher quality image than if the computing device determined and applied a common set of adjustments to an entire image.

Throughout the disclosure, examples are described where a computing system (e.g., a computing device, a client device, a server device, a computer, or other type of computing system) may analyze information (e.g., images) associated with a user. However, the computing system can be configured to only use the information after the computing system receives explicit permission from the user of the computing system to use the data. For example, in situations discussed below in which a computing device analyzes images being output from a camera integrated within a computing device, individual users may be provided with an opportunity to provide input to control whether programs or features of the computing device can collect and make use of the images, e.g., for automatic segmenting and manipulating the images. The individual users may have constant control over what programs can or cannot do with the images. In addition, information collected may be pre-treated in one or more ways before it is transferred, stored, or otherwise used by the computing system, so that personally identifiable information is removed. For example, before a computing device shares images with another device (e.g., to train a model executing at the other device), the computing device may pre-treat the images to ensure that any user identifying information or device identifying information embedded in the data is removed. Thus, the user may have control over whether information is collected about the user and user's device, and how such information, if collected, may be used by the computing device and/or a remote computing system.

In one example, a computer-implemented method includes receiving, by a processor of a computing device, an original image captured by a camera, automatically segmenting, by the processor, the original image into multiple regions of pixels, and independently applying, by the processor, a respective auto-white-balancing to each of the multiple regions. The computer-implemented method further includes combining, by the processor, the multiple regions to form a new image after independently applying the respective auto-white-balancing to each of the multiple regions; and outputting, by the processor and for display, the new image.

In a further example, a computing device is described that includes at least one processor configured to receive an original image captured by a camera, automatically segment the original image into multiple regions of pixels, and independently apply a respective auto-white-balancing to each of the multiple regions. The at least one processor is further configured to combine the multiple regions to form a new image after independently applying the respective auto-white-balancing to each of the multiple regions, and the at least one processor is further configured to output the new image for display.

In a further example, a system is described including means for receiving an original image captured by a camera, means for automatically segmenting the original image into multiple regions of pixels, and means for independently applying a respective auto-white-balancing to each of the multiple regions. The system further includes means for combining the multiple regions to form a new image after independently applying the respective auto-white-balancing to each of the multiple regions, and means for outputting, for display, the new image.

In another example, a computer-readable storage medium is described that includes instructions that, when executed, configure a processor of a computing device to receive an original image captured by a camera, automatically segment the original image into multiple regions of pixels, and independently apply a respective auto-white-balancing to each of the multiple regions. The instructions, when executed, further configure the processor to combine the multiple regions to form a new image after independently applying the respective auto-white-balancing to each of the multiple regions, and output the new image, for display.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of automatic segmenting and adjusting of images are described below. The use of the same reference numbers in different instances in the description and the figures indicate similar elements.

DETAILED DESCRIPTION

Figure 1:
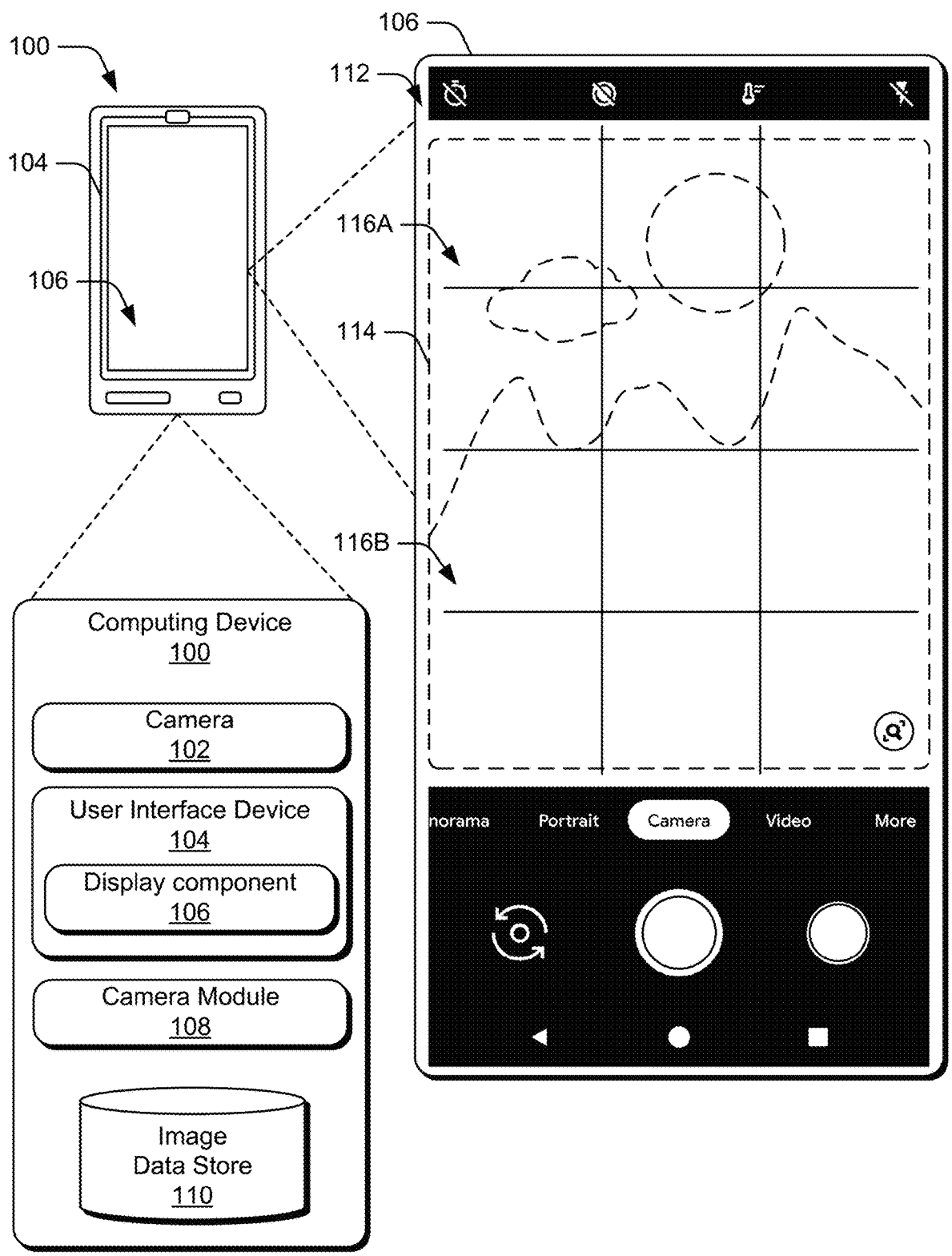
FIG. 1 is a conceptual diagram illustrating a computing device configured to automatically segment and adjust images.

FIG. 1 is a conceptual diagram illustrating a computing device 100 that is configured to automatically segment and adjust images. The computing device 100 automatically segments an image into different regions before automatically adjusting perceived exposure-levels or other characteristics associated with each of the different regions. As one example, the computing device 100 may segment an image depicting an object under a night sky into at least two regions, a "sky region" and a "non-sky region". The computing device 100 may adjust the white-balance of the sky region, darken the night sky, or cause the night sky to have less noise, while making different adjustments to the non-sky region to cause the object in the foreground to appear brighter relative to the background of the night sky.

The computing device 100 may be any type of mobile or non-mobile computing device.

As a mobile computing device, the computing device can be a mobile phone, a laptop computer, a wearable device (e.g., watches, eyeglasses, headphones, clothing), a tablet device, an automotive/vehicular device, a portable gaming device, an electronic reader device, or a remote-control device, or other mobile computing device. As a non-mobile computing device, the computing device 100 may represent a server, a network terminal device, a desktop computer, a television device, a display device, an entertainment set-top device, a streaming media device, a tabletop assistant device, a non-portable gaming device, business conferencing equipment, or other non-mobile computing device.

The computing device 100 includes a camera 102 and a user interface device 104 including a display 106. The computing device 100 also includes a camera module 108 and an image data store 110 configured to buffer or otherwise store images captured by the camera 102. These and other components of the computing device 100 are communicatively coupled in various ways, including through use of wired and wireless buses and links. The computing device 100 may include additional or fewer components than what is shown in FIG. 1.

The user interface device 104 manages input and output to a user interface of the computing device 100, such as input, and output associated with a camera interface 112 that is managed by the camera module 108 for controlling the camera 102 to take pictures or record movies. For example, the user interface device 104 may receive instructions from the camera module 108 that cause the display 106 to present the camera interface 112. In response to presenting the camera interface, the user interface device 104 may send the camera module 108 information about user inputs detected by the user interface device 104 in relation to the camera interface 112.

For receiving input, the user interface device 104 may include a presence-sensitive input component operatively coupled to (or integrated within) the display 106. The user interface device 104 can include other types of input or output components, including a microphone, a speaker, a mouse, a keyboard, a fingerprint sensor, a camera, a radar, or other type of component configured to receive input from a user. The user interface device 104 may be configured to detect various forms of user input, including two-dimensional gesture inputs, three-dimensional gesture inputs, audible inputs, sensor inputs, visual inputs, and other forms of input.

When configured as a presence-sensitive input component, a user of the computing device 100 can provide two-dimensional or three-dimensional gestures at or near the display 106 as the display 106 presents the camera interface 112. In response to the gestures, the user interface device 104 may output information to other components of the computing device 100 to indicate relative locations (e.g., X, Y, Z coordinates) of the gestures, and to enable the other components to interpret the gestures for controlling the camera interface 112 or other interface being presented on the display 106. The user interface device 104 may output data based on the information generated by the display 106 which, for example, the camera module 108 may use to control the camera 102.

The display 106 can be made from any suitable display technology, including LED, OLED, and LCD technologies. The display 106 may function as both an output device for displaying the camera interface 112, as well as an input device for detecting the user inputs associated with the camera interface 112. For example, the display 106 can be a presence-sensitive screen (e.g., a touchscreen) that generates information about user inputs detected at or near various locations of the display 106. The user interface device 104 may include a radar-based gesture detection system, an infrared-based gesture detection system, or an optical-based gesture detection system. The camera 102 is configured to capture individual, or a burst of, still images as pictures or record moving images as movies. The camera 102 may include a single camera or multiple cameras. The camera 102 may be a front facing camera configured to capture still images or record moving images from the perspective of the display 106. The camera 102 may be a rear facing camera configured to capture still images or record moving images from an opposite perspective of the display 106. Although illustrated and primarily described as an internal component of the computing device 100, the camera 102 may be completely separate from the computing device 100, for example, in cases where the computing device 100 performs post processing of images captured by external camera equipment including the camera 102.

The camera module 108 controls the camera 102 and the camera interface 112. The camera module 108 may be part of an operating system executing at the computing device 100. In other examples, the camera module 108 may be a separate component (e.g., an application) executing within an application environment provided by the operating system. The camera module 108 may be implemented in hardware, software, firmware, or a combination thereof. A processor of the computing device 100 may execute instructions stored in a memory of the computing device 100 to implement the functions described with respect to the camera module 108.

The camera module 108 exchanges information with the camera 102 and the user interface device 104 to cause the display 106 to present the camera interface 112. In response to user input associated with the camera interface 112, the camera module 108 processes the user input to adjust or manage the camera interface 112. For example, the camera module 108 may cause the user interface device 104 to display a view finder for taking photos using the camera interface 112. In response to detecting input at a location of the display 106 where a graphical button associated with the camera interface 112 is displayed, the camera module 108 receives information about the detected input. The camera module 108 processes the detected input and in response to determining a capture command from the input, the camera module 108 sends a signal that causes the camera 102 to capture an image 114. In the example of FIG. 1, the image 114 is of a mountain landscape with a full moon and some cloud cover shown in the background.

The image 114 may be a raw image that contains minimally processed data from the camera 102, or the image 114 may be any other image format as captured by the camera 102. In other examples, to improve efficiency, the image 114 may be a down-sampled version of the raw image (e.g., a low-resolution or thumbnail version). Yet in other examples, the image 114 may be a refined or enhanced version of the raw image that has been modified prior to undergoing automatic segmentation and adjustment processing.

The camera module 108 automatically segments and adjusts images to improve perceived image quality to match a human perception of a scene. The camera module 108 may perform the described segmentation and adjustment techniques automatically as an integrated part of an image capture process to enable the computing device 100 to perform the described techniques in (seemingly) real-time, e.g., before a captured image appears in a camera view finder and in response to determining a capture command from an input associated with the camera interface 112. In other examples, the camera module 108 performs the described segmentation and adjustment techniques as a post-process following the image capture process.

The camera module 108 can use a machine-learned model, such as a neural network, that is trained to automatically segment an image into distinct regions (e.g., background, foreground). For example, the camera module 108 retrieves the image 114 stored by the camera 102 from within the image data store 110. The camera module 108 segments the original image 114 into a first region 116A and a second region 116B. As shown in FIG. 1, the first region 116A is a sky region depicting features of a night sky and the second region 116B is a foreground region depicting objects or a scene under the night sky. The output from the machine-learned model can be used as a mask that the camera module 108 applies to the image 114 to isolate each of the regions 116A and 116B to independently adjust the pixels in each region 116A and 116B to improve image quality.

The machine-learned model of the camera module 108 may produce semantic based masks for masking out one region from another. The machine-learned model of the camera module 108 may produce other masks as well, for example, masks based on semantic and exposure information for masking out portions of an image region using different illuminations.

The image 114 may include a set of pixels represented by numbers indicating color variations (e.g., red, green, and blue) at a particular location on a grid. When the image 114 is input to the machine-learned model, the machine-learned model outputs a mask that indicates which pixels of the image 114 are likely to be considered part of each of the distinct regions 116A and 116B. The machine-learned model of the camera module 108 may assign a respective score to each pixel in the image 114. The respective score of each pixel is subsequently used by the camera module 108 to determine whether the pixel is associated with the regions 116A or the region 116B. For example, a score that exceeds a fifty percent threshold may indicate that a pixel is within the region 116A whereas a score that is less than the fifty percent threshold may indicate that the pixel is within the region 116B.

The camera module 108 may refine the mask output from the machine-learned model to improve efficiency and image quality. For example, the camera module 108 may apply a guided filter to the output from the machine-learned model.

By definition, a guided filter can be used to smooth edges of a mask to correspond to edges of objects depicted in an image. The guided filter receives as inputs: a guidance image (e.g., the pixels of the image 114) and a mask (e.g., from the machine-learned model) and outputs a refined mask. The guided filter may receive, from the machine-learned model, a confidence mask as an additional or alternative input to the guidance image and the mask. The guided filter matches the edges of the mask with the edges of objects seen in image 114. The main difference between the mask from the machine-learned model and the refined mask from the guided filter, is that each pixel in the refined mask is calculated as a weighted average of pixels in the mask from the machine-learned model. The guided filter determines the weights from the guidance image, the mask, and the confidence mask.

The camera module 108 may adapt the guided filter to perform edge-smoothing for specific types of images and image regions. For example, the camera module 108 may apply a particular guided filter that has been tailored for contouring edges of a night sky to generate a refined mask that more accurately defines the pixels of the image 114 that are part of the night sky in the first region 116A and more accurately define the pixels of the image 114 that are part of the foreground in the second region 116B.

By applying the guided filter, the camera module 108 removes ambiguity in the mask by re-scoring pixels of the image 114 with respective scores that are at or near (e.g., within plus or minus ten percent, five percent) a fifty percent threshold. Re-scoring may include marking some of the pixels with higher scores or lower scores so other components of the camera module 108 adjust or do not adjust the pixels. Refining the mask using the guided filter or other refinement technique ensures that edges of the mask conform to edges in the image 114, which in some cases, makes combining the regions 116A and 116B either during, or at the end of the adjustment process, more accurate, and can also lead to a higher-quality image. In some examples, the camera module 108 re-trains the machine-learned model based on the refined mask that is output from the guided filter to improve future segmentations performed by the machine-learned model on other images.

The camera module 108 may refine the mask output from the machine-learned model in other ways, in addition to or instead of using a guided filter. In some cases, the camera module 108 can apply multiple, different refinements. For example, a guided filter may be well-suited for edge-smoothing in some specific use cases. For other use cases (e.g., denoising, tune-mapping), a mask can be refined in other ways (e.g., using median filters, bilateral filters, anisotropic diffusion filters). For example, the camera module 108 may apply a guided filter to a mask for a particular use case and use a different type of refinement for a different use case.

With a refined mask, the camera module 108 can adjust characteristics of the different regions 116A and 116B, independently to create a new version of the original image 114. For example, the camera module 108 can apply the mask to the original image 114 to make first adjustments to the brightness, contrast, white-balance, noise, or other characteristics of the image region 116A and to further make second, different adjustments to the characteristics of the image region 116B. By adjusting each of the regions 116A and 116B separately, the camera module 108 can modify the original image 114 to appear as though the camera 102 captured the image 114 by simultaneously applying different exposure-levels, auto-white-balancing, and denoising to the night sky and the foreground, when producing the original image 114.

In this way, the computing device 100 can perform the described segmenting and editing techniques automatically, with or without user input. By using the machine-learned model the computing device can coarsely define boundaries of different regions and by using a modified guided filter or other refinement technique, the computing device can adjust the mask for each region to be sized and matched to the edges of objects in the image. The computing device 100 can therefore accurately identify the different regions and accurately define the edges of the different regions. By automatically segmenting an image before adjusting the image, the computing device 100 can adjust each of the different regions separately rather than try to adjust an entire image. The computing device 100 may therefore produce a better-quality image that matches the human perception of a scene than if the computing device 100 determined and applied a common set of adjustments to the entire image.

The computing device 100 may apply multiple masks to automatically segment and adjust an image, and the computing device 100 may reuse a single mask for automatically segmenting and adjusting multiple, distinct regions of an image in different ways. For example, the machine-learned model of the computing device 100 may output a single mask with multiple "indexes" for different objects or different regions of an image, or the machine-learned model of the computing device 100 may output a set of masks, with each mask covering a different object or a different region of the image.

Figure 2:
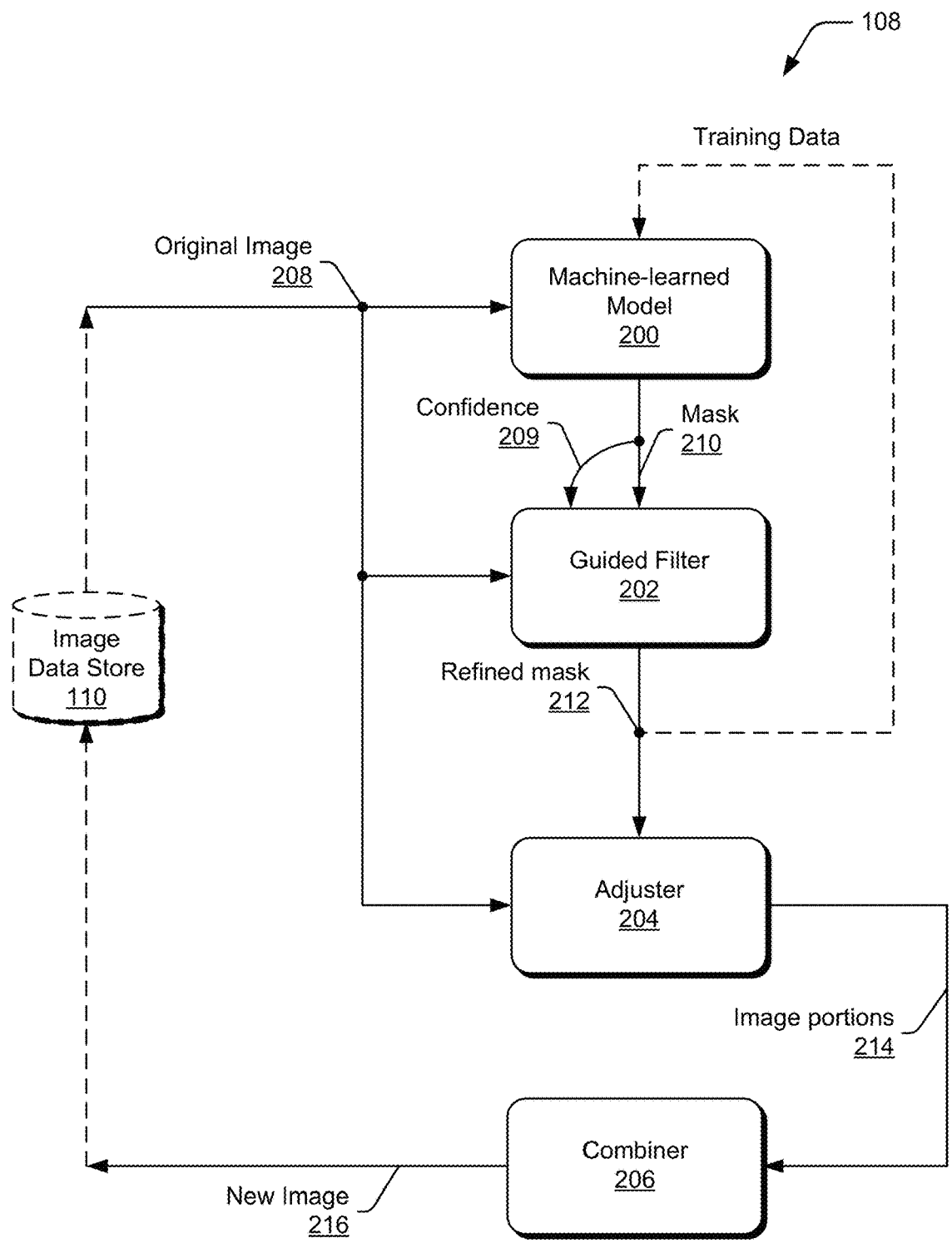
FIG. 2 is a conceptual diagram illustrating an example computing architecture for automatically segmenting and adjusting images.

FIG. 2 is a conceptual diagram illustrating an example computing architecture for automatically segmenting and adjusting images. The computing architecture of FIG. 2 is described in the context of camera module 108 from FIG. 1.

The camera module 108 may include a machine-learned model 200, a guided filter 202, an adjuster 204, and a combiner 206. The camera module 108 may implement the architecture shown in FIG. 2 in hardware, software, firmware, or a combination thereof.

As an overview of the architecture shown in FIG. 2, the machine-learned model 200 is configured to receive an original image 208 as input and output a mask 210. The mask 210 may assign a respective value or score to each pixel in the original image 208, where the value or score indicates a probability that the pixel is part of a particular region (e.g., a higher value may indicate that a pixel is more likely part of a sky region of the original image 208 as opposed to a non-sky region of the original image 208).

The guided filter 202 receives the mask 210, a confidence 209 (computed based on the mask 210), and the original image 208 as inputs, and outputs a refined mask 212. The refined mask 212 has smoother edges than the mask 210, resulting in edges of the refined mask 212 more closely correspond to edges of the original image 208 and visible boundaries of the different regions, as compared to the mask 210. In some examples, the machine-learned model 200 is re-trained based on the output from the guided filter 202 to improve the accuracy of subsequent masks that are output from the machine-learned model 200.

The adjuster 204 applies the refined mask to the original image 208 to make independent adjustments to portions of the original image 208 that are part of the mask, with or without adjusting portions of the original image 208 that fall outside the mask. The combiner 206 overlays the adjusted image portions 214 that are output from the adjuster to create a new image 216.

The machine-learned model 200 is trained using machine-learning techniques to segment the original image 208, automatically. The machine-learned model 200 may include one or more types of machine-learned models combined into a single model that provides the mask 210 in response to the original image 208. The machine-learned model 200 is configured to perform inference; the machine-learned model 200 is trained to receive the original image 208 as input and provide, as output data, a mask that defines regions of the original image 208 determined by the machine-learned model 200 from the pixels (e.g., the color values, locations) in the original image 208. In some cases, the machine-learned model 200 performs inference using a lower resolution version of the original image 208. Through performing inference using the machine-learned model 200, the camera module 108 can process the original image 208 locally to ensure user privacy and security. In other examples, the camera module 108 may access the machine-learned model 200 remotely, as a remote computing service. The camera module 108 may send the original image 208 to a remote computing device that executes the machine-learned model 200 and, in response, the camera module may receive the mask 210 from the remote computing device in response.

The machine-learned model 200 can be or include one or more of various different types of machine-learned models. In addition, the machine-learning techniques described herein are readily interchangeable and combinable. Although certain example techniques have been described, many others exist and can be used in conjunction with aspects of the present disclosure. The machine-learned model 200 can perform classification, regression, clustering, anomaly detection, recommendation generation, and/or other tasks.

The machine-learned model 200 can be trained using supervised learning techniques, for example, the machine-learned model 200 can be trained based on a training dataset that includes examples of masks inferred from corresponding examples of images. The machine-learned model 200 can be trained using unsupervised learning techniques as well.

The machine-learned model 200 can be or include one or more artificial neural networks (a type of "neural network"). As a neural network, the machine-learned model 200 can include a group of connected or non-fully connected nodes, referred to as neurons or perceptrons. As a neural network, the machine-learned model 200 can be organized into one or more layers and can in some cases include multiple layers when configured as a "deep" network. As a deep network, the machine-learned model 200, can include an input layer, an output layer, and one or more hidden layers positioned between the input layer and the output layer.

The machine-learned model 200 can be or include one or more recurrent neural networks. For example, the machine-learned model may be implemented as an end-to-end Recurrent-Neural-Network-Transducer-Image-Segmenting-Model. Example recurrent neural networks include long short-term (LSTM) recurrent neural networks, gated recurrent units, bi-direction recurrent neural networks, continuous time recurrent neural networks, neural history compressors, echo state networks, Elman networks, Jordan networks, recursive neural networks, Hopfield networks, fully recurrent networks, and sequence-to-sequence configurations.

The machine-learned model 200 can be or include one or more convolutional neural networks. A convolutional neural network can include one or more convolutional layers that perform convolutions over input data using learned filters or kernels. Convolutional neural networks are known for usefulness for analyzing imagery input data, such as still images or video.

The machine-learned model 200 can be trained or otherwise configured to receive the original image 208 as input data and, in response, provide the mask 210 as output data. The input data can include different types, forms, or variations of image data. As examples, in various implementations, the original image 208 can include raw image data, including one or more images or frames, stored by the camera 102 at the image data store 110. The original image 208 may in other examples be a processed image (e.g., a reduced or low-resolution version of one or more images stored in the image data store 110) obtained from the image data store 110 after the camera module 108 initially processes the image captured by the camera 102.

In response to receipt of the original image 208, the machine-learned model 200 can provide the mask 210. The mask 210 can include different types, forms, or variations of output data. As examples, the mask 210 can define a scoring for each of the pixels in the original image 208 and may include other information about the pixels and the scoring, such as a confidence associated with the scoring, or other data.

The machine-learned model 200 can be trained in an offline fashion or an online fashion. In offline training (also known as batch learning), the machine-learned model 200 model is trained on the entirety of a static set of training data, and in online learning, the machine-learned model 200 is continuously trained (or re-trained) as new training data becomes available (e.g., while the machine-learned model 200 is used to perform inference).

To train the machine-learned model 200, the training data used needs to be properly annotated before the machine-learned model 200 can generate inferences from the training data. Annotating every image (e.g., on the order of fifty thousand images) and every pixel in a set of training data in a short time can be challenging if not seemingly impossible. The machine-learned model 200 can be trained using an active-learning-pipeline involving an annotation process.

During an initial step in an active-learning pipeline, a "pilot" sub-set of the training data (e.g., approximately five thousand of the fifty thousand images) is annotated manually. For example, annotators can manually provide rough annotations of sky regions and non-sky regions, without marking a detailed boundary between the two regions. The machine-learned model 200 can be trained using the pilot sub-set of the training data and then execute inference on the rest of the training data (e.g., the other forty-five thousand images). In some cases, the guided filter 202 can be applied to inference results and fed back to the machine-learned model 200 to further improve how the machine-learned model 200 infers boundaries so that the boundaries within an image more accurately align with edges of objects in a scene.

The annotators may leave some of the detailed boundary unannotated. Before or after applying the guided filter 202, the unannotated parts of the boundary between a sky and non-sky region can be computationally annotated using a statistical method, such as density estimation technique. For example, to save time from manually annotating accurate boundaries, the annotators can leave a margin between the regions where some of the boundary between regions is unannotated. The margin can be computationally annotated to fill in the unannotated boundary using a statistical method (e.g., density estimation). For a single image, the statistical method can estimate the color distribution of the sky region, for example. This way, instead of carefully and manually annotating along the entire boundary of the regions, the annotators can coarsely annotate images and then, using a statistical method, the rest of the boundary can be computationally annotated with more granularity.

After being trained on the pilot sub-set of training data and running inference on the rest of the training data, during a subsequent step in the active-learning pipeline, the inference results can be verified, and only the inference results that contain errors are manually annotated. In this way, because not all the images need to be manually annotated, training time is saved; the amount of time required to train the machine-learned model 200 is reduced. The machine-learned model 200 can be subsequently trained, again, and can perform additional rounds of inference, verification, and annotations, as needed. The inference results that are not accurately segmented by the machine-learned model 200 can be manually or computationally segmented again and the machine-learned model 200 can be re-trained with the corrected images. The machine-learned model 200 can execute inference on the corrected images and other training data. The active-learning pipeline can be executed again, using additional training data, to improve the machine-learned model 200.

The camera module 108 and the machine-learned model 200, may be part of an operating system or system service executing at the computing device 100 and therefore, may more securely and better protect image data for automatic segmenting, than, for example, if the machine-learned model 200 executed at a remote computing system. Applications that interact with the operating system, for example, may interact with the machine-learned model 200 only if the camera module 108 or the operating system grants access to the applications. For example, an application may can communicate through the operating system to request access to the model 200 and the images stored at the image data store 110, using an application programming interface (API) (e.g., a common, public API across all applications). It should be understood that the machine-learned model 200 can be part of a remote computing system or may be embedded as a service or feature of a photo editing application executing at the computing device 100, or a different computing device that is separate from the camera module 108 and the camera. In addition by executing locally as part of an operating system, or system service of the computing device 100, the camera module 108 and the machine-learned model 200 may take inputs and provide outputs in response quicker and more efficiently without having to rely on a network connection between the computing device 100 and a remote server.

The guided filter 202 is configured to refine the mask 210 output from the machine-learned model 200 to produce a refined mask 212. The main difference between the mask 210 and the refined mask 212, is that the respective score of each pixel in the refined mask 212 represents a weighted average given the respective scores of other nearby pixels as derived from the mask 210. The guided filter 202 generates the refined mask 212 which redefines the different regions that are specified by the mask 210, to have edges that match the edges of objects in the original image 208 and that further align the boundaries of the different regions that are specified by the mask 210 to conform to the color variations at the visible boundaries of the different regions in the original image 208. Part of refining the mask 210 can include adding matting to each of the multiple regions to add transparency at parts of the original image 208. For example, matting can be added with a particular transparency value to smoothly transition from adjusting one region (e.g., for sky adjustments) to another region (e.g., for non-sky adjustments) in regions where pixels could be considered part of the two regions (e.g., part of sky and part of non-sky). Such mixed pixels can occur, for example, along object edges, or near semi-transparent objects (e.g., like frizzy hair).

The guided filter 202 may be a classical guided filter. In other examples, the guided filter 202 includes modifications over the classical guided filter, e.g., to improve efficiency. For example, a typical guided filter may analyze a single channel of the original image 208 with reference to the mask 210, whereas the guided filter 202, having been modified, may instead analyze color (e.g., RGB, YUV) channels of the original image 208 with reference to the mask 210 and may additionally apply a confidence mask.

For example, the mask 210 from the machine-learned model 200 may include ambiguous scores that are within a threshold of fifty percent. The camera module 108 may have little confidence that the scores with ambiguity can produce an accurate mask. As such, the guided filter 202 may discard or ignore pixels with scores that are within a threshold of fifty percent when optimizing the mask 210 to be the refined mask 212. In other words, the guided filter 202 may ignore pixels that do not clearly fall within one of the defined boundaries, and instead generate the refined mask 212 based on the remaining pixels with scores that are outside the threshold of fifty percent. For example, machine-learned model 200 may output the mask 210 with edges that do not necessarily follow contours of objects in the image precisely. For example, an image may show a tree silhouetted against the sky. Far away from the tree the pixels of the mask 210 can contain values that indicate with a high degree of confidence that the pixels belong to a sky region. For pixels inside the tree trunk the mask 210 can indicate with a high degree of confidence that the pixels belong to a non-sky region. However, the tree may have an intricate outline, with fine branches and leaves. For pixels in the image that are near the outline of the tree, the mask 210 can contain values that indicate uncertainty that the pixels are part of either the sky region or the non-sky region. The guided filter 202 can create a new, refined mask where every pixel has a high confidence of being in the sky-region or the non-sky region, except for pixels that straddle the outline of the tree, where the mask indicates something in-between (e.g., a thirty percent confidence of being in the sky region or a seventy percent confidence of being in the non-sky region).

Overall, a user may have an idea of what a nighttime sky or a daytime sky should look like, and oftentimes a daytime or nighttime sky in a photo does not meet the expectation that the user may have even though the photo may actually be a realistic representation of the sky. The camera module 108 can adjust each segmented region (e.g., sky region, non-sky region) separately, to make the appearance of each region match the user's expectations by making it more vibrant, darker, or uniform, while maintaining or independently improving the quality of the other regions.

Using the refined mask 212 as a guide, the adjuster 204 adjusts individual regions of the original image 208 to produce individual image portions 214 (also referred to as image layers). Each of the individual portions 214 represents a segmented region of the original image 208, as defined by the refined mask 212, with adjustments made to improve quality. The adjuster may modify the individual regions of the original image 208 in one or more various ways.

The adjuster 204 may perform tone mapping and may adjust a brightness or an amount of darkness associated with a particular region of the original image 208. For example, for sky regions of the original image 208, the adjuster 204 can darken the pixels to make a sky appear more vibrant. Also referred to as tone mapping, the adjuster 204 can follow a bias curve to adjust the darkness of the particular region, thereby maintaining black and white pixels while darkening or lightening grey or other colored pixels.

The adjuster 204 may apply a separate auto-white-balancing function to each of the different regions of the original image 208. For example, the adjuster 204 can apply a first auto-white-balancing function to a sky region and a second, different auto-white-balancing function to a foreground region. This way, the adjuster 204 can cause the sky region to appear more blue or black without discoloring objects in the foreground region, the adjuster 204 can estimate the true color of the sky without considering the color of the foreground.

The adjuster 204 may rely on a machine-learned model that is trained to select and apply an auto-white-balancing function based on the pixels of a segmented-region of the original image 208. For example, the model may infer whether a segmented-region represents a sky region or a non-sky region based on the colors of the pixels and the scores applied to the pixels and apply a specific auto-white-balancing function that is tuned to enhance the visual appearance of features that commonly appear in the sky (e.g., sun, moon, clouds, stars). The model may apply a different auto-white-balancing function to the non-sky region that is tuned to enhance objects in the foreground.

The adjuster 204 may therefore apply two or more auto-white-balancing functions to enhance the original image 208.

The adjuster 204 may operate as a function of context of the computing device 100. For example, the adjuster 204 may receive a signal from the camera module 108 that is indicative of an absolute light-level associated with an operating environment in which the original image 208 is captured. Digital photos typically contain exposure information, and an absolute light level at a time when a photo was taken can be inferred from this information. Low-light or bright-light auto-white-balancing can be applied if image segmentation and adjustments occur long after (e.g., greater than a second) an image was taken, for example, in by an application that executes outside the computing device 100 (e.g., at a server in a data center, or on a desktop computer). Responsive to determining that the operating environment is in a low-light condition, the adjuster may apply a low-light, auto-white-balancing function whereas the adjuster 204 can apply a moderate or high-light, auto-white-balancing function in response to determining the operating environment is in a moderate or high-light environment.

The adjuster 204 can selectively remove noise from the different regions of the original image 208. For example, the adjuster 204 can remove noise from a sky region more aggressively to make the sky appear smooth or make the sky have a uniform gradient that is free of "blotches". The adjuster 204 may determine a group of pixels lacks sufficient gradient (e.g., a group of pixels may have constant color instead of a gradient from light to dark or dark to light) compared to coloration of other parts of the sky region and average or otherwise adjust the coloration of the pixels in the group to appear like the surrounding pixels that are outside the group. The adjuster 204 can apply a band-stop filter to smooth uneven skies, for example.

In some examples, the adjuster 204 retains noise or refrains from removing the noise, depending on a size or quantity of pixels associated with the noise. For example, a sky region may have a more pleasing appearance if small or very large groups of pixels are retained, whereas medium-sized groups of pixels are adjusted (e.g., averaged). The adjuster 204 can selectively denoise by averaging the medium-sized groups of pixels without altering the other groups of pixels that are smaller or larger in size. Said differently, pixels in a sky-region can be smoothed to reduce a blotchy appearance by filtering out medium spatial frequencies and retaining only high and very low spatial frequencies. Fine details such as stars are represented by high frequencies, and smooth color gradients are represented by low frequencies, but medium frequencies should not occur in an image of a clear, blue sky. If medium frequencies do occur, the pixels are likely noise, and filtering the medium frequencies tends to improve the appearance of the sky. The adjuster 204 may refrain from applying such a filter to cloudy regions within the sky, as doing so may remove visually important details and the clouds can look "washed out" or unrealistic.

The combiner 206 of the camera module 108 composites the outputs from the adjuster 204 into a new image 216. The combiner 206 may perform alpha blending techniques and layer the image portions 214 on top of each other and apply an alpha blending function to the layers of the image portions 214. The alpha blending function may rely on a parameter "alpha", which is determined based on the refined mask 212, that defines how transparent one of the image portions 214 is compared to the other image portions 214.

The combiner 206 takes the image portions 214 and blends or composites the image portions 214 to generate the new image 216.

If required, the combiner 206 may perform up-sampling techniques to recreate the new image 216 with a resolution that is at the same resolution as the original image 208. For instance, prior to reaching the machine-learned model 200, the original image 208 can be down-sampled to improve efficiency of the camera module 108. Therefore, the combiner 206 may perform up-sampling of each of the image portions 214 to recreate the new image 216 with a resolution that is at or near the same resolution of the original image 208. The combiner 206 may perform up-sampling techniques at different points in the above image processing pipeline. For example, the combiner 206 may perform up-sampling techniques before the adjuster 204 performed refinement techniques to create the image portions 214.

The architecture shown in FIG. 2 is one example of the camera module 108. The camera module 108 may perform additional adjustments to give the new image 216 a visual effect that appears as if the camera 102 was configured to capture the original image 214 as the new image 216 to match the human perception of the scene.

Figure 3:
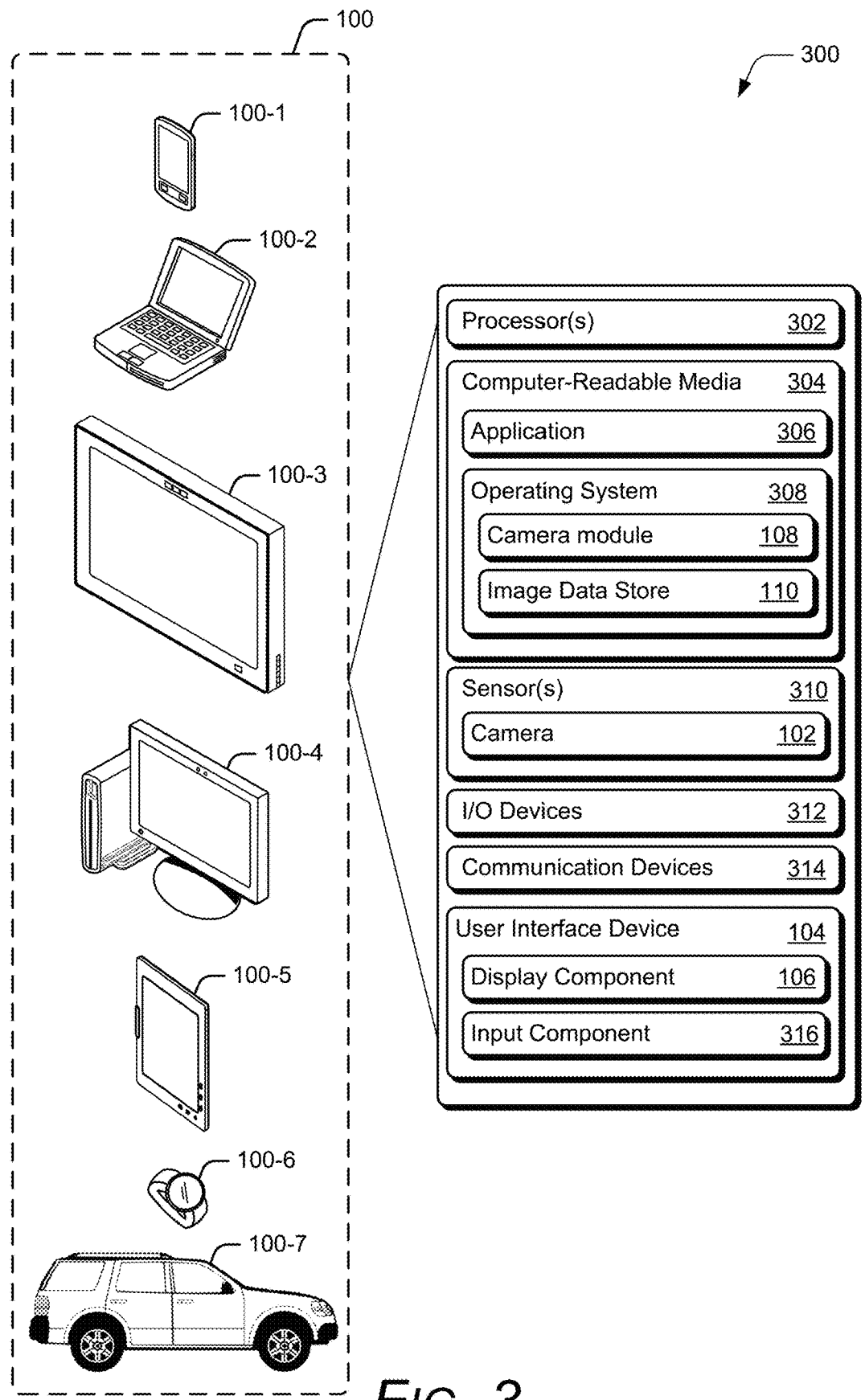
FIG. 3 is a conceptual diagram illustrating another computing device configured to automatically segment and adjust images.

FIG. 3 is a conceptual diagram illustrating another computing device configured to automatically segment and adjust images. FIG. 3 illustrates a computing device 300, which is an example of the computing device 100, with some additional detail. As shown in FIG. 3, the computing device 300 may be a mobile phone 100-1, a laptop computer 100-2, a television/display 100-3, a desktop computer 100-4, a tablet device 100-5, a computerized watch 100-6 or other wearable device, or a computing system installed in a vehicle 100-7.

In addition to each of the components shown in FIG. 1, the computing device 300 includes one or more processors 302, a computer-readable media 304, one or more sensors 310, one or more input/output (I/O) devices 312, and one or more communication devices 314. The computer-readable media 304 includes instructions, that when executed by the processors 302, execute an application 306 and an operating system 308. The operating system 308 can include the camera module 108 and the image data store 110 or the camera module 108 and/or the image data store 110 may be kept separate (e.g., at a remote server) from the operating system 308. The sensors 310 include the camera 102. The user interface device 104 includes the display component 306 in addition to an input component 316.

The processors 302 may include any combination of one or more controllers, microcontrollers, processors, microprocessors, hardware processors, hardware processing units, digital-signal-processors, graphics processors, graphics processing units, and the like. The processors 302 may be an integrated processor and memory subsystem (e.g., implemented as a "system-on-chip"), which processes computer-executable instructions to control operations of the computing device 300.

The sensors 310 obtain contextual information indicative of a physical operating environment of the computing device and/or characteristics of the computing device 300 while functioning in the physical operating environment. Beyond the camera 102, additional examples of the sensors 310 include movement sensors, temperature sensors, position sensors, proximity sensors, ambient light sensors, moisture sensors, pressure sensors, and the like. The application 306, the operating system 308, and the camera 102 may tailor operations according to sensor information obtained by the sensors 310.

The input/output devices 312 provide additional connectivity, beyond just the user interface device 104, to computing device 300 and other devices and peripherals, including data network interfaces that provide connection and/or communication links between the device, data networks (e.g., a mesh network, external network, etc.), and other devices or remote computing systems (e.g., servers). Input/output devices 312 can be used to couple the computing device 300 to a variety of different types of components, peripherals, and/or accessory devices. Input/output devices 312 also include data input ports for receiving data, including image data, user inputs, communication data, audio data, video data, and the like.

The communication devices 314 enable wired and/or wireless communication of device data between the computing device 300 and other devices, computing systems, and networks. The communication devices 314 can include transceivers for cellular phone communication and/or for other types of network data communication.

The computer-readable media 304 is configured to provide the computing device 300 with persistent and non-persistent storage of executable instructions (e.g., firmware, recovery firmware, software, applications, modules, programs, functions, and the like) and data (e.g., user data, operational data) to support execution of the executable instructions. Examples of the computer-readable media 304 include volatile memory and non-volatile memory, fixed and removable media devices, and any suitable memory device or electronic data storage that maintains executable instructions and supporting data. The computer-readable media 304 can include various implementations of random-access memory (RAM), read only memory (ROM), flash memory, and other types of storage memory in various memory device configurations. The computer-readable media 304 excludes propagating signals. The computer-readable media 304 may be a solid-state drive (SSD) or a hard disk drive (HDD). The computer-readable media 304 in the example of FIG. 3 includes the application 306 and the operating system 308.

The application 306 can be any type of executable or program that executes within an operating environment of the computing device 300. Examples of the application 306 include a third-party camera application, a messaging application, photo-editing application, an image re-touching application, a social media application, a virtual reality or augmented reality application, a video conferencing application, or other application that interfaces with the camera 102 and relies on the camera module 108 to enhance images captured with the camera 102 on behalf of the application 306.

For example, the application 306 can be a program that provides controls for a user to manually edit or manipulate an image captured by the camera 102 before passing the image on to another function of the application 306. For example, as a social media application or a photo-editing application, the application 306 can interface with the camera module 108 (e.g., as a plug-in or system service accessed by the application 306) to enable the application 306 to enhance an image captured by the camera 102, by automatically segmenting and adjusting the image, automatically, before using the image to perform a function such as posting the image to a social media account of a user or otherwise outputting the image for display.

The operating system 308 of computing device 300 includes the camera module 108 and the image data store 110. The operating system 308 generally controls functionality of the computing device 300, including the user interface device 104 and other peripherals. The operating system 308 provides an execution environment for applications, such as the application 306. The operating system 308 may control task scheduling, and other general functionality, and generally does so through a system-level user interface. The user interface device 104 manages input and output to the operating system 308 and other applications and services executing at the computing device 300, including the application 306.

The user interface device 104 includes an input component 316. The input component 316 can include a microphone. The input component 316 may include a pressure-sensitive or presence-sensitive input component that is integrated with the display component 306, or otherwise operatively coupled to the display component 306. Said differently, the display component 306 and the input component 316 may together provide touchscreen or presence-sensitive screen functionality for enabling the computing device 300 to detect and interpret gesture inputs associated with the camera interface 112. The input component 316 can include an optical, an infrared, a pressure-sensitive, a presence-sensitive, or a radar-based gesture detection system.

In operation, the processors 302 receive data from the camera 102 indicative of an original image captured by the camera 102. The camera module 108, while executing at the processors 302, automatically segments the original image received by the processors 302 into multiple regions of pixels. The camera module 108 independently applies a respective auto-white-balancing to each of the multiple regions and combines the multiple regions of pixels to form a new image. The camera module 108 may send the new image to the application 306, for example, directing the application 306 to present the new image. By interfacing with the operating system 308, the application 306 can send the new image to the user interface device 104 with instructions for outputting the new image for display at the display component 306.

Figure 4:
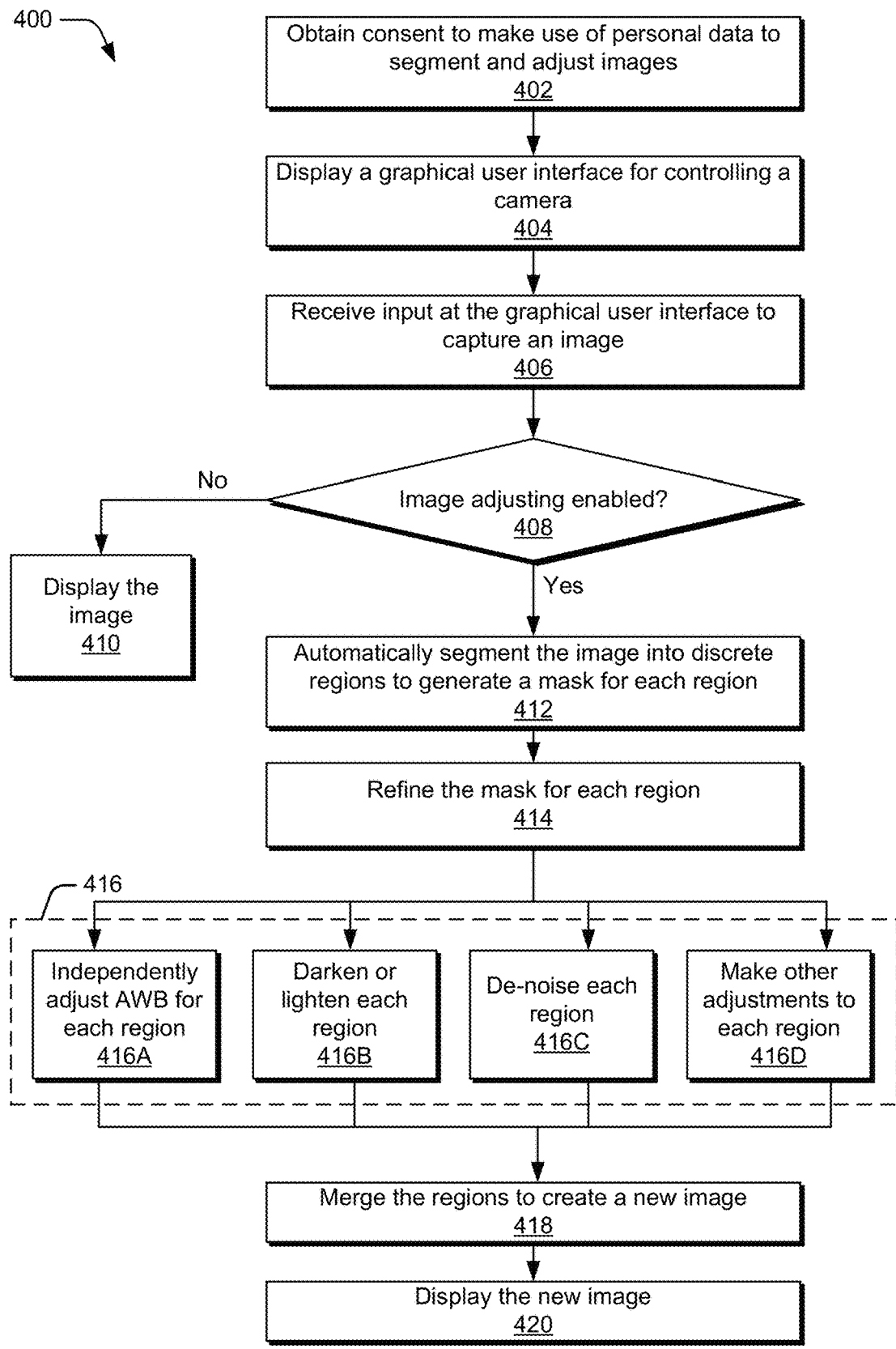
FIG. 4 is a flow-chart illustrating example operations of a computing device configured to automatically segment and adjust images.

FIG. 4 is a flow-chart illustrating example operations of a computing device configured to automatically segment and adjust images. FIG. 4 shows operations 402 through 420 that define a process 400 that the computing devices 100 and 300 may perform to automatically segment and adjust an image captured by the camera 102. The operations 402 through 420 can be performed in a different order than that shown in FIG. 4, including additional or fewer operations. The operations 400 are described below in the context of computing device 100. It should be understood however that some or all of the operations 400 may performed by or with the assistance of a remote computing system, such as a cloud server or a workstation communicating with the computing device 100 via a computer network.

At 402, the computing device 100 obtains consent to make use of personal data to segment and adjust images. For example, the computing device 100 may only process image data after the computing device 100 receives explicit permission from a user of the computing device 100 to use the image data. The computing device 100 may obtain the explicit permission from the user when the user selects an option to enable such functionality, or when the user affirmatively responds via user input to a prompt provided by the computing device 100 that requests the explicit permission.

At 404, the computing device 100 displays a graphical user interface for controlling a camera. The camera 102 may provide image data to the camera module 108 indicative of a current view from the camera 102. The camera module 108 may format the image data for presentation by the user interface device within the camera interface 112. Through user inputs associated with the camera interface 112, the camera module 108 enables precise control over an image ultimately captured by the camera 102.

At 406 the computing device 100 receives input at the graphical user interface to capture an image. For example, the camera module 108 may receive an indication of user input detected by the user interface device 104. The camera module 108 can determine a function associated with the user input (e.g., a zoom function, a capture command). The camera module 108 may determine the function is for controlling the camera 102 to take a picture and in response to equating the user input to a capture command, the camera module 108 may direct the camera 102 to capture the image 114.

At 408, the computing device 100 determines whether to automatically segment and adjust the image. For example, the computing device 100 may provide an opportunity for a user of the computing device 100 to provide user input for deciding whether the computing device 100 should enhance the image 114. If not, the computing device 100 may output the original image 114 for display. Otherwise, at 412, the computing device 100 automatically segments the image into discrete regions to generate a mask for each region. For example, a machine-learned module of the camera module 108 may receive the image 114 (or a down-sampled variant of the image 114) as input. The machine-learned model is trained to coarsely define boundaries of different regions of the image 114 and output a mask indicating which pixels of the image 114 belong to which of the different regions.

At 414 the computing device 100 refines the mask for each region. For example, the camera module 108 can rely on a guided filter that uses the image 114 as a guide to adjust the mask for each region to be right-sized and smoothed around the edges to conform to the edges of the image 114 and the other regions. The camera module 108 may modify pixels associated with the mask to add matting to the mask to conform the mask to the edges of the image 114.

At 416, the computing device 100 independently adjusts each of the different regions of the image 114 using the refined mask. The computing device 100 can tailor adjustments to the image 114 based on content depicted within the image 114. In other words, the computing device 100 can apply different adjustments to different types of regions.

For example, the camera module 108 may assign a type identifier to each of the different regions of the image 114. The camera module 108 may rely on the machine-learned model that is used to segment the image 114 to specify the type. The camera module 108 may perform other operations to determine the type of a region in other ways, for example, by performing image recognition techniques to identify specific objects within the image 114 and in response to identifying certain objects, classify each region according to the objects identified within the different regions. For example, the camera module 108 may determine that a portion of the image 114 includes an object such as a cloud, a sun, a moon, a star, etc. In response to identifying an object that is typically associated with a sky, the camera module 108 may classify the region as being a sky-type region. As another example, in response to identifying an animal or a person within a particular region of the image 114, the camera module 108 can classify the region as being a foreground region or a non-sky region instead of a sky region.

The camera module 108 can classify each region to different degrees to better tailor adjustments made to the image 114 to improve quality. For example, in response to determining that a region is a sky-type region, the camera module 108 may further classify a region as being either a night-sky region or a day-sky region.

In any event, at 416A, the computing device 100 independently applies a respective auto-white-balancing to each of the multiple regions. For example, the camera module 108 may determine a respective type classifying each of the multiple regions, and based on the respective type, the camera module 108 can select an auto-white-balancing to apply to each of the multiple regions. The camera module 108 can apply the respective auto-while-balancing selected for each of the multiple regions thereby enabling the computing device 100 to produce images that appear to have been captured using different exposure-levels for different parts of a scene or to produce images with separate auto-white balancing and denoising across different parts of the scene.

In some examples, the computing device 100 may apply an auto-white-balancing multiple times to an image or particular region, to further enhance the overall image quality. For example, in response to classifying one of the regions 116A or 116B of the image 114 as a sky region that includes a pixel representation of a sky, the camera module 108 may perform a first auto-white-balancing of the sky region before subsequently performing a second auto-white-balancing function that the camera module 108 applies to the sky region and other non-sky regions that include pixel representations of objects other than the sky.

In some cases, the camera module 108 uses the same auto-white-balancing function on different regions of the image 114, even though the camera module 108 applies the auto-white-balancing function independently to each of the different regions. In other cases, the camera module 108 may apply different auto-white-balancing functions to two or more regions of the image 114. For example, the camera module 108 may select a respective auto-white-balancing function for each of the multiple regions of the image 114. The camera module 108 may select the auto-white-balancing function based on region type. The camera module 108 may select a first auto-white-balancing for each of the multiple regions that is determined to be a sky region and select a second, different auto-white-balancing for each of the multiple regions that is determined to be a non-sky region. Applying a respective, sometimes different, auto-while-balancing function to each of the multiple regions may enable the computing device 100 to produce a new higher-quality image than the original image. The new image may appear to have been captured using camera technology configured to match human perception of a scene.

At 416B, the computing device 100 independently darkens or lightens each of the multiple regions. For example, prior to combining the multiple regions to form the new image, the camera module 108 can independently adjust how dark or how light the pixels in each region appear, to enhance or subdue certain regions, to improve overall image quality. For example, the camera module 108 may apply different brightness or darkness filters to the pixels according to a respective type classifying each of the multiple regions. That is, the camera module 108 may increase the brightness of a foreground type region and darken a background type region. The camera module 108 can darken a night-sky type region and lighten a day-sky region, as one example.

At 416C, and prior to combining the multiple regions to form the new image, the computing device 100 independently de-noises each region. The computing device 100 may remove noise from each of the multiple regions according to a respective type classifying each of the multiple regions. For example, in response to determining the respective type classifying a particular region from the multiple regions is a sky region, the camera module 108 may average certain groups of noisy pixels that appear with a size and frequency that satisfies a threshold. A sky background in an image may appear more appealing to a user if medium blocks of noisy pixels are removed. However, the sky background may appear artificial if all the noise is removed. Therefore, the camera module may retain the groups of noisy pixels that are a size and frequency that is less than or greater than the threshold such that small and large groups of noisy pixels are retained while medium-sized groups of noisy pixels are averaged.

At 416D, the computing device 100 may perform other adjustments to the regions of the image 114 before compiling the different regions into a new image. For example, the camera module 108 may up-sample the portions of the image 114 that are associated with the different regions to a resolution that is at or near the resolution of the image 114 before the image 114 underwent auto-segmentation.

At 418, the computing device 100 merges the regions to create a new image. For example, the camera module 108 may layer portions of the image 114 that have been modified after applying the refined mask to create a unified image where the different regions have been blended and smooth to appear as if the camera 102 originally captured the unified image, as opposed to the original image 114.

At 420, the computing device displays the new image. For example, the camera module 108 may send a signal to the user interface device 104 that causes the display component 306 to output the new image for display within the camera interface 112.

FIGS. 5A through 5D graphically illustrate a process performed by a computing device to automatically segment and adjust an image. FIGS. 5A through 5D are described in succession and in the context of a computing device 500, which is an example of computing device 100 of FIG. 1.

Figure 5A:
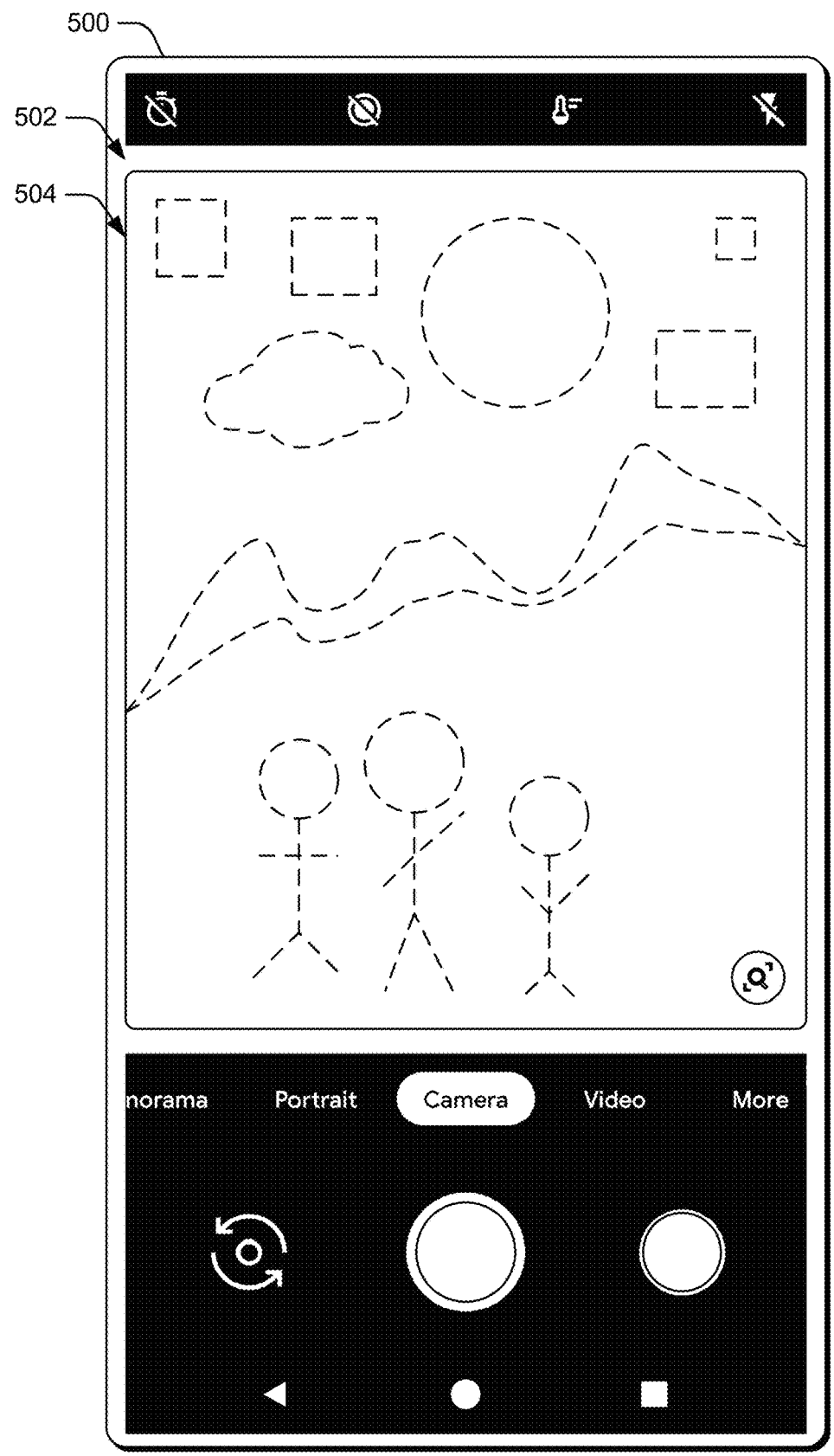
FIGS. 5A through 5D graphically illustrate a process performed by a computing device to automatically segment and adjust an image.

In the example of FIG. 5A, the computing device 500 displays a graphical user interface 502. The computing device 500 receives an original image 504 captured by a camera based on features captured in a viewfinder of the graphical user interface 502. The original image 504 includes a group of people near a mountainous landscape in the foreground and further includes mountains, a moon, a cloud, and blotches of noise (represented by rectangles) in the background.

Figure 5B:
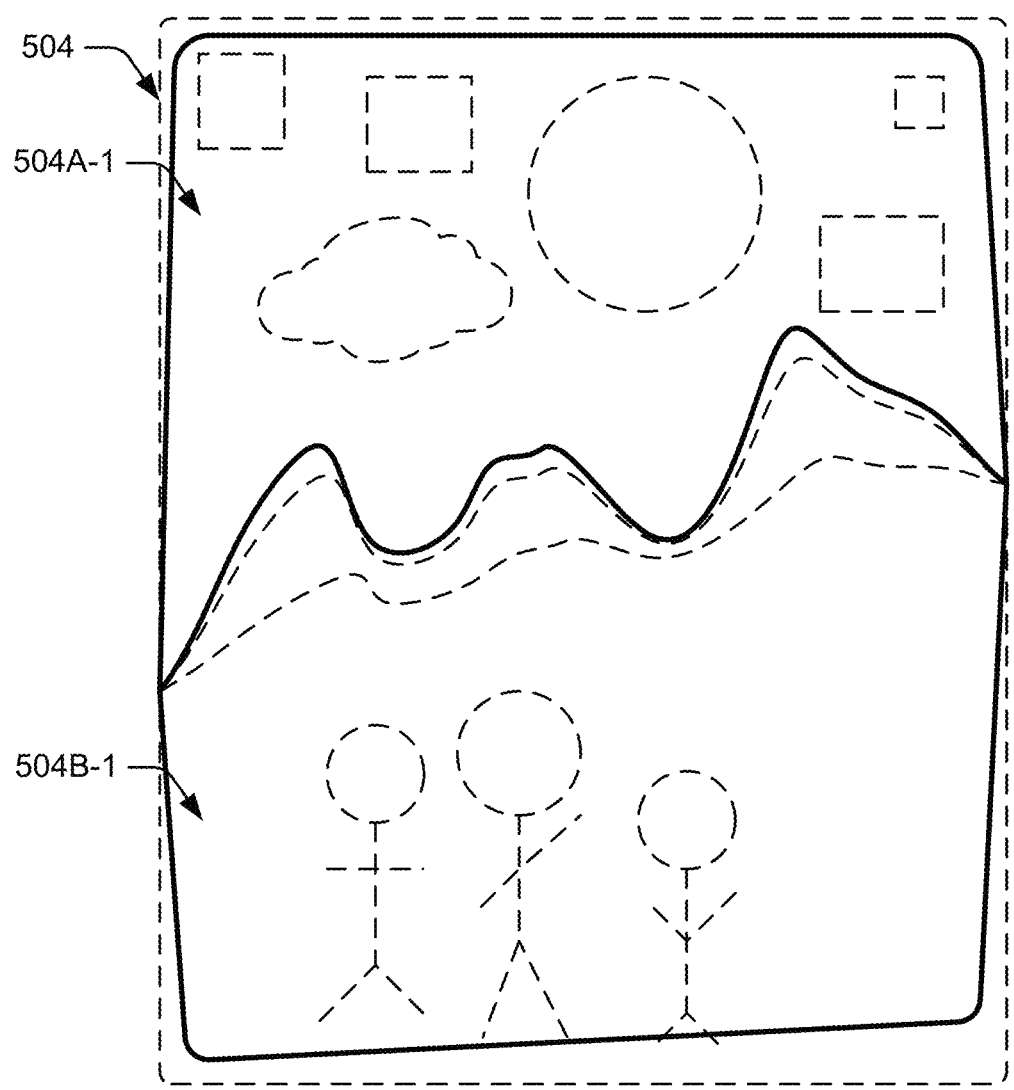

FIG. 5B shows that the computing device 500 automatically segments the original image 504 into multiple regions of pixels 504A-1 and 504-B-1. For instance, a machine-learned model executing at the computing device 500 may automatically define coarse boundaries where pixels transition from one region to another. As shown in FIG. 5B, the mask may redefine the region 504A-1 as being a background region and the region 504B-1 as a foreground region.

Figure 5C:
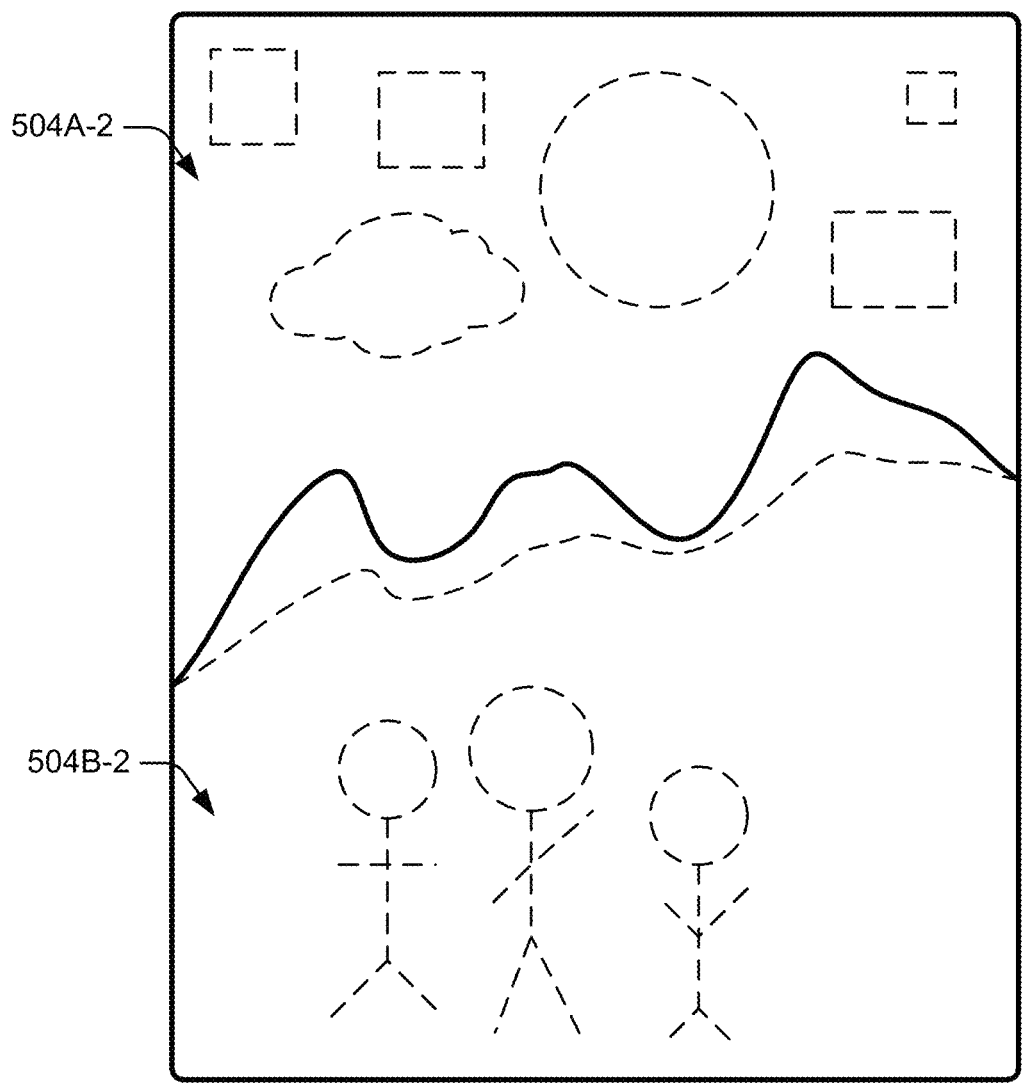

FIG. 5C depicts how the computing device 500 can refine the mask defined by the machine-learned model to fit the regions of pixels 504A-1 and 504B-1 to the edges of the image 504. For example, by adding matting and/or applying a guided filter to the mask for each of the regions of pixels 504A-1 and 504B-1, the computing device 500 produces refined masks that define regions of pixels 504A-2 and 504B-2 which, as shown in FIG. 5C, have edges that conform to the edges of the image 504 and the other regions.

Figure 5D:
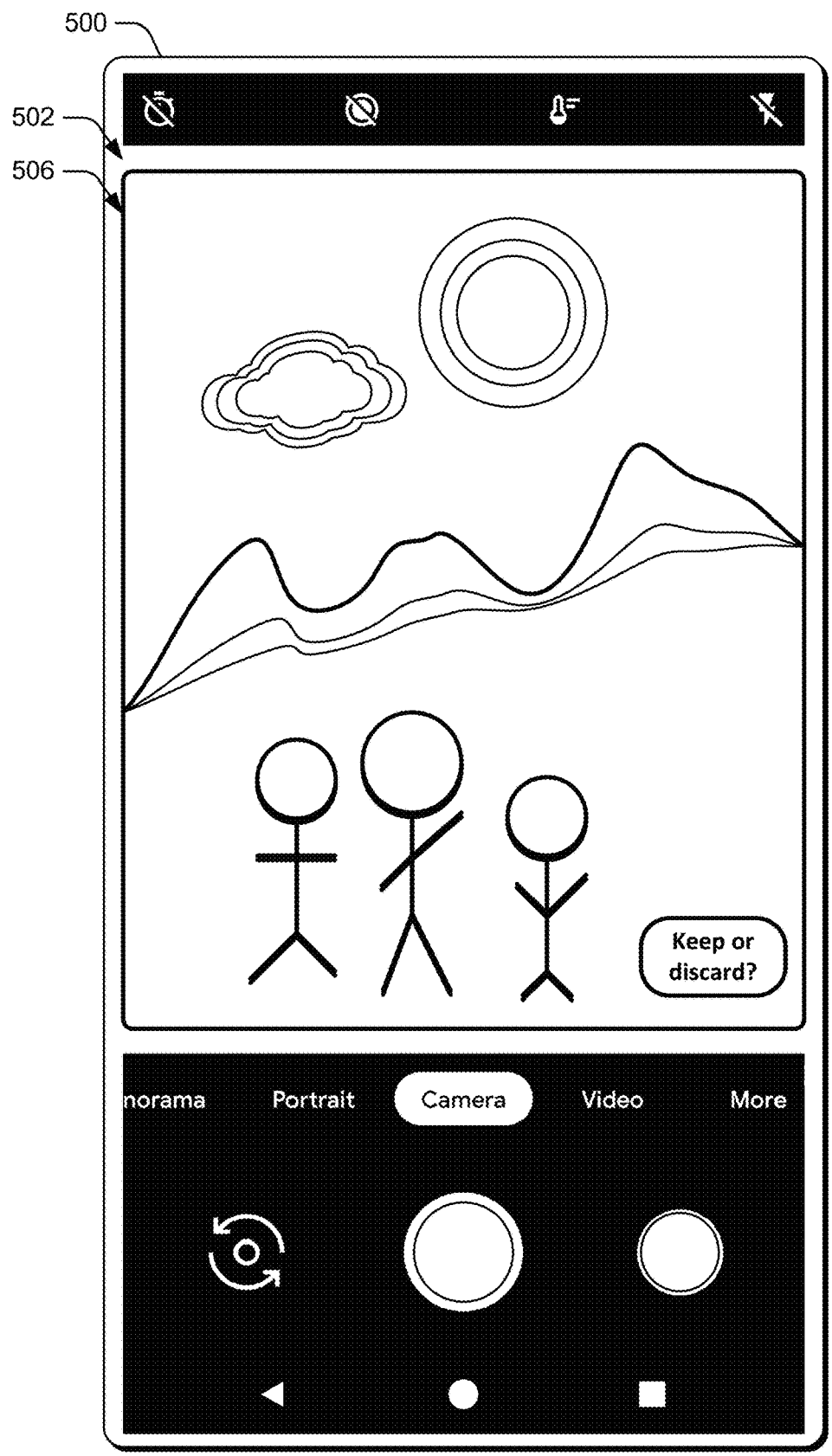

FIG. 5D shows a new image 506 displayed within the graphical user interface 502. The new image 506 is generated by the computing device 500 by independently applying a respective auto-white-balancing to each of the multiple regions of pixels 504A-2 and 504B-2 before combining the multiple regions of pixels 504A-1 and 504B-2 to form the new image 506.

In this way, the computing device 500 is shown in FIGS. 5A through 5D to have produced the new image 506 that appears to be of higher quality than the original image 504. By using the machine-learned model the computing device 500 can coarsely define boundaries of different regions 504A-1 and 504B-1 and use the guided filter to adjust the mask to define the regions 504A-2 and 504B-2 to be right-sized and smoothed around the edges. The computing device 500 can therefore accurately identify the different regions 504A-1 and 504B-1 and accurately define the edges of the different regions 504A-2 and 504B-2. In this way, a more accurate segmentation of the original image can be provided. By automatically segmenting the image 504 into multiple regions of pixels 504A-2 and 504B-2, before adjusting portions of the image 504 that correspond to the multiple regions of pixels 504A-2 and 504B-2, the computing device 500 can adjust each of the different regions of pixels 504A-2 and 504B-2 separately rather than trying to adjust and improve the quality of the entire, original image 504 using a single complex refinement technique. The computing device 500 may therefore produce the new image 506 with higher quality than if the computing device 500 determined and applied a common set of adjustments to the entire, original image 504.

Clause 1. A computer-implemented method including: receiving, by a processor of a computing device, an original image captured by a camera; automatically segmenting, by the processor, the original image into multiple regions of pixels; independently adjusting, by the processor, a respective characteristic of each of the multiple regions; combining, by the processor, the multiple regions to form a new image after independently adjusting the respective characteristic of each of the multiple regions; and outputting, by the processor and for display, the new image.

Clause 2. The computer-implemented method of clause 1, wherein automatically segmenting the original image into the multiple regions comprises: inputting the original image or a downsampled version of the original image into a machine-learned model, wherein the machine-learned model is configured to output a mask indicating which pixels of original image or the downsampled version of the original image are contained within each of the multiple regions.

Clause 3. The computer-implemented method of clause 2, wherein the mask further indicates a respective degree of confidence associated with each of the pixels of the original image or the downsampled version of the original image that the pixel is contained within each of the multiple regions.

Clause 4. The computer-implemented method of clause 2 or 3, wherein automatically segmenting the original image into the multiple regions comprises: refining the mask by adding matting to each of the multiple regions.

Clause 5. The computer-implemented method of any of clauses 1-4, wherein independently adjusting the respective characteristic of each of the multiple regions comprises independently applying, by the processor, a respective auto-white-balancing to each of the multiple regions.

Clause 6. The computer-implemented method of clause 5, wherein independently applying the respective auto-white-balancing to each of the multiple regions comprises: determining a respective type classifying each of the multiple regions; selecting the respective auto-white-balancing for each of the multiple regions based on the respective type;

and applying the respective auto-while-balancing selected for each of the multiple regions.

Clause 7. The computer-implemented method of clause 6, wherein the respective type classifying each of the multiple regions includes a sky region including a pixel representation of a sky or a non-sky region including a pixel representation of one or more objects other than the sky.

Clause 8. The computer-implemented method of any of clauses 5-7, wherein selecting the respective auto-white-balancing for each of the multiple regions based on the respective type comprises selecting a first auto-white-balancing for each of the multiple regions that is determined to be a sky region and selecting a second, different auto-white-balancing for each of the multiple regions that is determined to be a non-sky region.

Clause 9. The computer-implemented method of any of clauses 1-8, wherein independently adjusting the respective characteristic of each of the multiple regions comprises independently adjusting, by the processor and according to a respective type classifying each of the multiple regions, a respective brightness associated with each of the multiple regions.

Clause 10. The computer-implemented method of any of clauses 1-9, wherein independently adjusting the respective characteristic of each of the multiple regions comprises independently removing, by the processor and according to a respective type classifying each of the multiple regions, noise from each of the multiple regions.

Clause 11. The computer-implemented method of clause 10, further comprising: determining the respective type classifying each of the multiple regions; and in response to determining the respective type classifying a particular region from the multiple regions is a sky region type, averaging groups of noisy pixels in the particular region from the multiple regions that are a size and frequency that satisfies a threshold.

Clause 12. The computer-implemented method of clause 11, further comprising: further in response to determining the respective type classifying the particular region from the multiple regions is the sky region type, retaining groups of noisy pixels in the particular region from the multiple regions that are a size and frequency that is less than or greater than the threshold.

Clause 13. The computer-implemented method of any of clauses 1-12, wherein outputting the new image comprises outputting, for display, the new image automatically and in response to receiving an image capture command from an input component of the computing device, the image capture command directing the camera to capture the original image.

Clause 14. A computer-implemented method for segmenting an image into multiple regions of pixels, the method comprising: receiving, by a processor of a computing device, an original image captured by a camera; inputting the original image into a machine-learned model, wherein the machine-learned model is configured to output a mask indicating which pixels of the original image are contained within each of the multiple regions; and refining, using a guided filter, the mask by adding matting to each of the multiple regions.

Clause 15. A computing device comprising at least one processor configured to perform any of the methods of clauses 1-14.

Clause 16. The computing device of clause 15, wherein the computing device comprises the camera.

Clause 17. The computing device of clause 15, wherein the computing device is different than a computing device that comprises the camera.

Clause 18. A computer-readable storage medium comprising instructions that, when executed, configure a processor of a computing device to perform any of the methods of clauses 1-14.

Clause 19. A system comprising means for performing any of the methods of clauses 1-14.

Clause 20. A computing system comprising a computing device communicatively coupled to a remote server, the computing system being configured to perform any of the methods of clauses 1-14.

Clause 21. The computing system of clause 20, wherein the computing device comprises the camera.

Clause 22. The computing system of clause 20, wherein the computing system comprises another computing device that comprises the camera.

While various preferred embodiments of the disclosure are described in the foregoing description and shown in the drawings, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A computer-implemented method comprising:
receiving, by a processor of a computing device, an original image captured by a camera;
automatically segmenting, by the processor, the original image into multiple regions of pixels by outputting a mask indicating which pixels of the original image or a down-sampled version of the original image are contained within each of the multiple regions;
using a guided filter to add matting to each of the multiple regions to refine the mask to generate a refined mask;
independently adjusting, by the processor, a respective characteristic of each of the multiple regions as indicated by the refined mask;
combining, by the processor, the multiple regions to form a new image after independently adjusting the respective characteristic of each of the multiple regions; and
outputting, by the processor and for display, the new image.

2. The computer-implemented method of claim 1, wherein automatically segmenting the original image into the multiple regions comprises:
inputting the original image or the downsampled version of the original image into a machine-learned model, wherein the machine-learned model is configured to output the mask indicating which pixels of the original image or the downsampled version of the original image are contained within each of the multiple regions.

3. The computer-implemented method of claim 2, wherein the mask further indicates a respective degree of confidence associated with each of the pixels of the original image or the downsampled version of the original image that the pixel is contained within each of the multiple regions.

4. The computer-implemented method of any of claim 1, wherein independently adjusting the respective characteristic of each of the multiple regions comprises independently applying, by the processor, a respective auto-white-balancing to each of the multiple regions.

5. The computer-implemented method of claim 4, wherein independently applying the respective auto-white-balancing to each of the multiple regions comprises:
determining a respective type classifying each of the multiple regions;

selecting the respective auto-white-balancing for each of the multiple regions based on the respective type; and applying the respective auto-while-balancing selected for each of the multiple regions.

6. The computer-implemented method of claim 5, wherein the respective type classifying each of the multiple regions includes a sky region including a pixel representation of a sky or a non-sky region including a pixel representation of one or more objects other than the sky.

7. The computer-implemented method of any of claim 4, wherein selecting the respective auto-white-balancing for each of the multiple regions based on the respective type comprises selecting a first auto-white-balancing for each of the multiple regions that is determined to be a sky region and selecting a second, different auto-white-balancing for each of the multiple regions that is determined to be a non-sky region.

8. The computer-implemented method of any of claim 1, wherein independently adjusting the respective characteristic of each of the multiple regions comprises independently adjusting, by the processor and according to a respective type classifying each of the multiple regions, a respective brightness associated with each of the multiple regions.

9. The computer-implemented method of any of claim 1, wherein independently adjusting the respective characteristic of each of the multiple regions comprises independently removing, by the processor and according to a respective type classifying each of the multiple regions, noise from each of the multiple regions.

10. The computer-implemented method of claim 9, further comprising:
    determining the respective type classifying each of the multiple regions; and
    in response to determining the respective type classifying a particular region from the multiple regions is a sky region type, averaging groups of noisy pixels in the particular region from the multiple regions that are a size and frequency that satisfies a threshold.

11. The computer-implemented method of claim 10, further comprising:
    further in response to determining the respective type classifying the particular region from the multiple regions is the sky region type, retaining groups of noisy pixels in the particular region from the multiple regions that are a size and frequency that is less than or greater than the threshold.

12. The computer-implemented method of any of claim 1, wherein outputting the new image comprises outputting, for display, the new image automatically and in response to receiving an image capture command from an input component of the computing device, the image capture command directing the camera to capture the original image.

13. A computing device comprising at least one processor configured to:
    receive an original image captured by a camera;
    automatically segment the original image into multiple regions of pixels by outputting a mask indicating which pixels of the original image or a downsampled version of the original image are contained within each of the multiple regions;
    use a guided filter to add matting to each of the multiple regions to refine the mask to generate a refined mask;
    independently adjust a respective characteristic of each of the multiple regions as indicated by the refined mask;
    combine the multiple regions to form a new image after independently adjusting the respective characteristic of each of the multiple regions; and
    output, for display, the new image.

14. The computing device of claim 13, wherein the at least one processor is configured to automatically segment the original image into the multiple regions by:
    inputting the original image or the downsampled version of the original image into a machine-learned model, wherein the machine-learned model is configured to output the mask indicating which pixels of the original image or the downsampled version of the original image are contained within each of the multiple regions.

15. The computing device of claim 14, wherein the mask further indicates a respective degree of confidence associated with each of the pixels of the original image or the downsampled version of the original image that the pixel is contained within each of the multiple regions.

16. The computing device of claim 13, wherein the at least one processor is configured to independently adjust the respective characteristic of each of the multiple regions by independently applying a respective auto-white-balancing to each of the multiple regions.

17. The computing device of claim 13, wherein the at least one processor is configured to independently apply the respective auto-white-balancing to each of the multiple regions by:
    determining a respective type classifying each of the multiple regions;
    selecting the respective auto-white-balancing for each of the multiple regions based on the respective type; and
    applying the respective auto-while-balancing selected for each of the multiple regions.

18. A non-transitory computer readable medium comprising program instructions executable by at least one processor to:
    receive an original image captured by a camera;
    automatically segment the original image into multiple regions of pixels by outputting a mask indicating which pixels of the original image or a downsampled version of the original image are contained within each of the multiple regions;
    use a guided filter to add matting to each of the multiple regions to refine the mask to generate a refined mask;
    independently adjust a respective characteristic of each of the multiple regions as indicated by the refined mask;
    combine the multiple regions to form a new image after independently adjusting the respective characteristic of each of the multiple regions; and
    output, for display, the new image.

* * * * *